Patented Aug. 14, 1951

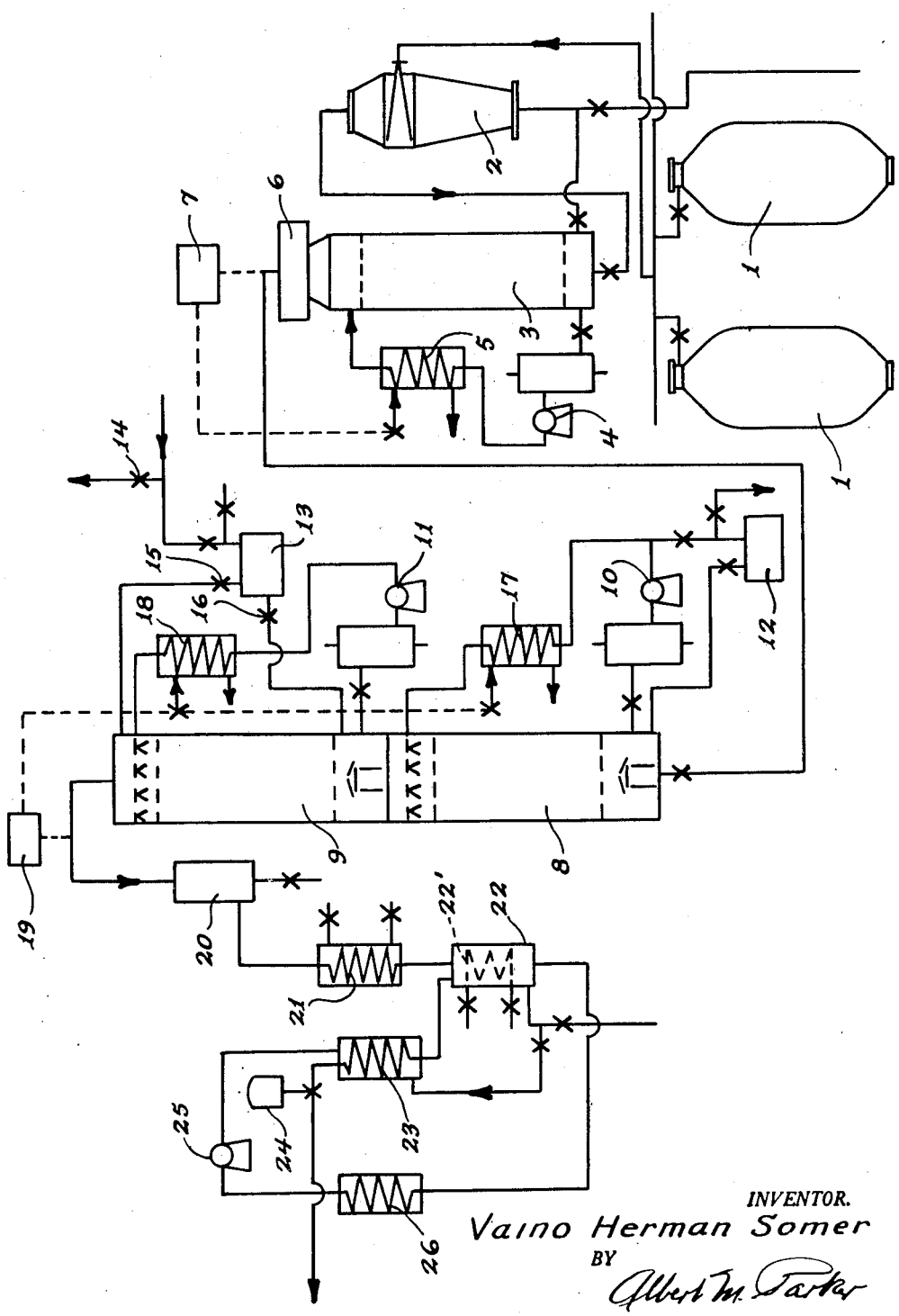

2,564,452

UNITED STATES PATENT OFFICE 2,564,452

METHOD FOR RECOVERING SULFUR DIOXIDE IN LIQUID FORM

Väinö Herman Somer, Lauritsala, Finland, assignor of one-half to Aktiebolaget Kaukas Fabrik, Lauritsala, Finland Application October 26, 1946, Serial No. 706,007
In Finland March 1, 1946

3 Claims. (Cl. 62—175.5)

In the production of sulfite pulp, in bleaching and in saccharification of wood by means of sulfur dioxide it is important that the sulfur dioxide content of the treating liquor be easily and quickly adjustable, which is best possible by the use of liquid sulfur dioxide. Adjunct to the above processes there are obtained large amounts of waste sulfur dioxide in gaseous form, which has heretofore been recovered for use either in gas form or first compressed for use, which latter method, however, necessitates extensive and costly apparatus and an appreciable added consumption of power.

According to the invention here presented the disadvantages above mentioned are avoided and the sulfur dioxide is obtained in liquid and anhydrous or water-containing form by a utilization of the fact that the gases issuing from the process are already under pressure and of so saturated a composition as to make it possible to condense them in a continuous process by cooling and letting off the pressure through a recovery apparatus so dimensioned that a production of liquid sulfur dioxide corresponding to the stream of gas through the apparatus is attained. The apparatus can easily be made to function entirely automatically.

In the following the invention will be described more in detail, with reference to the accompanying drawing, which is a schematic representation of the equipment for putting the invention here presented in practice in connection with the manufacture of sulfite pulp, where the composition of the blow-off gases at 100–140° C., and where the pressure, indicated by the abbreviation ata., is absolute including the atmospheric pressure of 1 kg./m.² according to theoretical calculations as confirmed by investigations carried out, has the following mean values:

| | Ata. |
|---|---|
| $SO_2$ | 2.99 |
| $CO_2$ | 0.36 |
| $N_2$ | 0.33 |
| $H_2O$ | 2.13 |
| | 5.81 |

From a number of boilers 1 at the above-named temperature in which there is free gas space in consequence of drawing off digesting liquor employed for separating technical chemical pulp from wood and generally consisting of bisulfites or sulfites of alkalies or alkaline earth materials with an excess of free $SO_2$ the gases are piped off to a dirt trap 2, where drops of liquid, sawdust, chips, etc. are removed. From this the gases are conducted to a cooling tower 3, either with a fill, such as Raschig rings or the like, or without, where they are cooled by a liquid spray down to about 40° C. by means of the circulation pump 4 and cooler 5. The circulation pump 4 may suitably be, for example, a helical worm type, and the cooler is coupled into the system, for instance, after the pump. The temperature of the cooling water in the lower portion of tower 3 can suitably be regulated by proper dimensioning of the apparatus to, for example 90° C. Water vapor is condensed in the tower, and the excess water thus accumulating is tapped off over a weir to the drain and on from there, either periodically or continuously and automatically by means of the condensate take-off conduit. The condensate water is naturally accompanied by a certain amount of dissolved sulfur dioxide, which does not, however, amount to more than 1–2% of the amount of $SO_2$ entering the tower and can, moreover, be recovered since the water gives off the $SO_2$ when the pressure is released to atmospheric pressure at the temperature mentioned, and the gases thus arising can be conducted, for example, to the acid tower. A temperature regulator 7 controls the flow of cooling fluid, which may consist either of water or, for example, of tower acid, so as to maintain the desired temperature of preferably about 40° C. of the gases leaving tower 3 substantially constant. In place of the cooling by means of liquid spray described an indirect heat exchanger 6 may also be used, if desirable also in conjunction with apparatus 4 and 5.

Taking into consideration the calculated solubilities of $SO_2$, the composition of the gases in tower 3 at 40° C. and a pressure of 6 ata. is about the following:

| | kg./m.³ | Per Cent by weight | Per Cent by volume |
|---|---|---|---|
| $SO_2$ | 9.297 | 87.807 | 80.66 |
| $CO_2$ | 0.787 | 7.435 | 9.85 |
| $N_2$ | 0.458 | 4.235 | 9.05 |
| $H_2O$ | 0.046 | 0.433 | 0.54 |

Totals: 10.588 kg./m.³; 100.000 per cent by wt.; 100.00 per cent by vol.

It may be observed that at high pressure the quantity of water vapor in the gases amounts to only a fraction of the proportion that would accompany the other gases at normal pressure. This is a direct result of Dalton's law, according to which the total pressure amounts to the sum of the partial pressures. It must further be pointed out that the amount of water vapor present in the gases is further decreased by the amount of water vapor condensed at this pressure and temperature, even though this amount is small, thereby further improving the result. For this reason the water vapor content of the gases issuing from tower 3 is already so low as to allow the gas mixture to be condensed as it is to a liquid sulfur dioxide of relatively low water content.

The gas mixture can, however, be dried yet further, which is suitably accomplished, for example, by means of strong sulfuric acid. The partial pressure of water vapor over concentrated sulfuric acid is so small that one liter of air after drying at 25° C. contains only 0.000003 gr. of water. This corresponds to about 1.3 parts of water per million parts of sulfur dioxide. Since the proportion of water decreases at high pressure the drying operation can be carried out at the specified higher temperature of 40° C. without raising the water content over 150 parts of water per million parts of sulfur dioxide, which is of great importance since the iron of the apparatus begins to be corroded if the water content rises over this value.

For the drying operation concentrated sulfuric acid is taken from the acid tank 13, which is connected to the upper and lower end of tower 9 by the conduits 15 and 16 respectively. Circulating pump 11 provided with a sump, causes the acid to circulate and trickle down through the tower packing. The gas mixture from tower 3, or correspondingly from the exchanger 6 at the upper end of cooling tower 3, is introduced at the bottom of the tower 8 situated under tower 9 and streams upward through this tower and through the gas port in its upper end into tower 9, while through the same gas port between the towers sulfuric acid diluted in the drying operation in tower 9 flows down into tower 8 in a measure as concentrated acid is added to tower 9 from the tank 13. In the same manner as with the concentrated acid in tower 9 the diluted acid in tower 8 is also caused to circulate and be distributed evenly over the tower pack, which may consist of, for example, Raschig rings, by means of a circulation pump 10 and a sprinkler nozzle in the upper end of the tower. Towers 8 and 9 each have a grate for the pack (or filling) arranged over the protective hood of the entrance port. The sulfuric acid in the two towers circulates through the coolers 17 and 18 and the flow of cooling water to these coolers is automatically regulated by means of the temperature regulator 19 so that the heat of dilution of the sulfuric acid is removed and the temperature of the gases thus remains just at the desired height, for instance 40° C., when it issues from the drying process.

Should particularly pure sulfur dioxide be desired the small amounts of sulfuric acid entrained with the gases can be removed by allowing the gases to pass through a container 20 or the like serving as a droplet trap and filled, for example, with hard metallurgic coke. The container 20 is located in the system between the drying tower 9 and the subsequent condensing apparatus, commencing with the cooler 21. Said container is a cyclone separator and separates out small drops in case particularly pure $SO_2$ is needed.

The dilute sulfuric acid from tower 8 is tapped off for other uses via container 12. Even the small amount of sulfur dioxide that is carried off by this sulfuric acid may be recovered, since the gas separates completely from the acid when the pressure is let off to 1 atmosphere and may then be fed to the acid tower. The consumption of sulfuric acid being of the order of 5 kg. $H_2SO_4$ to every 100 kg. $SO_2$, the dissolving of only 10–15% $SO_2$ in the sulfuric acid, which itself again amounts to 5% of the whole amount of sulfur dioxide, causes no appreciable change in the amount of sulfur dioxide obtained, i. e. in the composition of the gas, especially since other gases are also soluble in sulfuric acid, though in a minor degree.

The dry gas coming from tower 9 is then condensed in the apparatus 21, 22, which will be explained further on. If it is intended to produce sulfur dioxide containing water the drying apparatus can be omitted or by-passed and the gas mixture issuing from cooling tower 3 condensed direct, in connection with which process attention should be paid to the following facts.

Water and sulfur dioxides are not mutually soluble in all proportions. It is possible to obtain water solutions which still have the character of water and a maximum dissolved sulfur dioxide content of 29%. Liquid sulfur dioxide, on the other hand, can dissolve a maximum of 22% water by weight.

When sulfur dioxide gas mixtures containing water, such as the gases issuing from cooling tower 3, are cooled, the two solutions mentioned above separate in two layers, the lighter water solution of sulfur dioxide forming the top layer.

Below we give the values for the condensation pressure of sulfur dioxide containing water:

| Temperature | 100% $SO_2$ | 89% $SO_2$ + 11% $H_2O$ | 78% $SO_2$ + 22% $H_2O$ |
|---|---|---|---|
| | Ata. | Ata. | Ata. |
| 10° C | 2.3 | 2.00 | 1.65 |
| 20° C | 3.3 | 2.95 | 2.6 |
| 30° C | 4.6 | 4.15 | 3.7 |
| 40° C | 6.3 | 5.65 | 5.0 |
| 50° C | 8.2 | 7.4 | 6.6 |
| 60° C | 10.7 | 9.7 | 8.7 |

The condensation pressure corresponding to other water contents can be obtained with sufficient exactness by interpolation between these values.

The solution of liquid sulfur dioxide and water has the character of liquid sulfur dioxide, and corresponds to $SO_2$-monohydrate. Even the gases from the dying towers 8 and 9, from which sulfur dioxide is now to be obtained in liquid form according to the process of the invention, always contain a certain percentage of moisture.

On the basis of the above elucidated facts it is clear that the temperature and pressure of the gases should on the one hand be regulated so that condensation does not take place, for instance, in the drying process, but on the other hand too high a temperature should also be avoided since it would increase the partial pressure of water vapor and thus cause retention of a higher water content of the gases in the drying process.

With due regard for this point the gases are now cooled indirectly at 21 to the desired temperature of +40° C. while maintaining the full pressure upon them decreased only by the least possible loss of pressure arising in an apparatus suitably dimensioned for the purpose. As an example we might mention that the pressure drop is 2 mm. water column per 1 meter of a tube filled with Raschig rings of 25 x 25 x 2 mm. dimensions and in which the rate of flow of the gas is 0.05 m./sec. and the amount of water is 6 m.$^3$/m.$^2$/h., which shows that it is not difficult to keep up the pressure. If the gases were previously dried in towers 8 and 9 sulfur dioxide in liquid form is obtained and is collected in container 22. If the drying towers are by-passed or omitted the product obtained consists, on account of the water content of the uncondensed gases, partly of water containing liquid sulfur dioxide and partly uncondensed gases, which may be further cooled for liquification or be utilized as such.

The sulfur dioxide content of the uncondensed gases in percent by volume may be calculated by the formula:

$$\frac{\text{Partial pressure of } SO_2 \text{ at the temperature considered}}{\text{Total pressure}} \times 100$$

In the case of the (gases from the) pulp digestion we thus obtain:

|  | Percent |
|---|---|
| +20° C | 55.0 |
| +10° | 38.4 |
| 0° | 26.4 |
| −10° | 17.0 |

In case the gases cooled have been dried, or if no gases other than sulfur dioxide are present, as for example if the sulfur dioxide is produced by distilling off from some absorbent or adsorbent, this problem of uncondensed gases does not arise; in this case a temperature of 20° C. at a pressure of 3.35 ata. is sufficient to liquify the sulfur dioxide entirely. If such a procedure is used it is, therefore, advantageous to distill off the sulfur dioxide at a somewhat higher temperature, since the resulting distillation pressure rises rapidly. By so proceeding less apparatus is necessary and the cost of drying is less, while the cost of a compressor and power for the same is eliminated. The cooling unit need not be situated within doors, making the building costs less. Admittedly the evaporation at a higher temperature consumes somewhat more heat, corresponding to the work of compression, but it is to be remarked that plants of this kind usually function in conjunction with metallurgic plants, where our present technological knowledge makes available large amounts of heat, as for example in connection with a Nichols-Freeman oven. Moreover, we must observe that in the large industrial countries, as compared for instance with the Scandinavian countries, the price of power is usually relatively higher than that of fuel (natural gas, lignite coal, etc.). The amount of cooling water necessary is of the same order whether the process disclosed in this invention or a compressor is used.

The drawing further shows an apparatus for lowering the temperature of the uncondensed gases (or the condensing system as a whole). The first element is the container 22 here shown as equipped with a cooling coil 22', though such a coil is not always a requisite. Liquid SO₂ passes from the bottom part of the container 22, regulated by a needle valve, into the cooler 23. Evaporation of the liquid SO₂ takes place in the cooler 23 and the purge gas is cooled down when passing the inner part of the coil. The compressor 25 first sucks out the uncondensed SO₂ gas and then compresses it so that it is condensed to liquid form again by means of the cooler 26. This apparatus serves as a cooling machine. The heat of vaporization of this gas is led away from the gas mixture in condenser 23 or from the liquid sulfur dioxide in the container 22. The condenser 26 coupled after compressor 25 condenses the sulfur dioxide to liquid form again, and it flows back to container 22.

Whether or not this second condensing unit is employed the pressure regulator 24 automatically maintains the pressure in the aggregate and thus fixes the amount of gas passing through.

With the exception of a few months in summer the condenser arrangement just described, which can of course be replaced by any other suitable condensing unit, is superfluous in regions with a sufficiently cold climate, but its use is justified wherever heat at low temperature is available (absorption refrigeration units). The aggregate is generally unnecessary in connection with the pulp industry, for it is possible in the summer months to allow a correspondingly greater quantity of gas to flow through the plant to attain condensation by the resulting larger pressure gradient, the issuant uncondensed gases being conducted, for example, to the acid tower. In many cases it is also possible to use spring or well water, or to provide by a graduation system the necessary small quantities of water, amounting to about 1000–2000 l./h. per 100 kg. of sulfur dioxide after drying.

What is claimed is:

1. A method for obtaining sulfur dioxide in liquid form which comprises drawing off a mixture of gases from the digester of a sulfite pulp cooking process while maintaining the pressure on said gases at substantially 5 to 6 atmospheres, said mixture of gases being substantially saturated with sulfur dioxide, passing the mixture of gases in countercurrent flow with respect to cooling water in a cooling tower, condensing the moisture from said mixture of gases, removing said mixture of gases so dried, introducing it into the first stage of a sulfuric acid tower and passing it in countercurrent flow with respect to dilute sulfuric acid, removing the mixture from said first stage and passing it through the second stage of a sulfuric acid tower in countercurrent flow with respect to concentrated sulfuric acid, thereby diluting the concentrated acid to produce the said dilute acid, partially absorbing sulfur dioxide in the acid of both stages, and removing acid from each stage, reducing the pressure on the said acid of each stage to release said absorbed sulfur dioxide, cooling the acid subsequent to the removal of absorbed sulfur dioxide and reintroducing it into its respective stage.

2. A method as defined in claim 1 wherein sulfur dioxide is absorbed in the cooling water, the step of removing said absorbed sulfur dioxide from said cooling water.

3. A method as defined in claim 1 and including removing said mixture of dried gases from said sulfuric acid tower, condensing said mixture and separating the liquified sulfur dioxide from said lower boiling point impurities.

VÄINÖ HERMAN SOMER.

REFERENCES CITED

The following references are of record in the file of this patent:

UNITED STATES PATENTS

| Number | Name | Date |
|---|---|---|
| 1,317,688 | Davenport | Oct. 7, 1919 |
| 1,616,703 | Richter | Feb. 8, 1927 |
| 1,810,312 | Hasche | June 16, 1931 |
| 1,847,845 | Mullen | Mar. 1, 1932 |
| 1,905,068 | Sperr, Jr. | Apr. 25, 1933 |
| 1,939,693 | Hasche | Dec. 19, 1933 |
| 1,939,696 | Hasche | Dec. 19, 1933 |